(12) United States Patent
Parodi et al.

(10) Patent No.: US 9,550,626 B2
(45) Date of Patent: Jan. 24, 2017

(54) MACHINES FOR SORTING OBJECTS

(71) Applicant: FINMECCANICA—Società per azioni, Rome (IT)

(72) Inventors: Carlo Parodi, Rome (IT); Michele Costa, Rome (IT); Giampiero Bolsieri, Torre d'Isola (IT)

(73) Assignee: FINMECCANICA—Società per azioni, Rome (IT)

( * ) Notice: Subject to any disclaimer, the term of this patent is extended or adjusted under 35 U.S.C. 154(b) by 0 days.

(21) Appl. No.: 15/024,871

(22) PCT Filed: Sep. 30, 2013

(86) PCT No.: PCT/IB2013/059005
§ 371 (c)(1),
(2) Date: Mar. 25, 2016

(87) PCT Pub. No.: WO2015/044720
PCT Pub. Date: Apr. 2, 2015

(65) Prior Publication Data
US 2016/0236870 A1  Aug. 18, 2016

(51) Int. Cl.
| | |
|---|---|
| *B65G 17/16* | (2006.01) |
| *B65G 17/12* | (2006.01) |
| *B65G 17/18* | (2006.01) |
| *B65G 17/34* | (2006.01) |
| *B07C 3/08* | (2006.01) |

(52) U.S. Cl.
CPC .............. *B65G 17/123* (2013.01); *B07C 3/08* (2013.01); *B65G 17/18* (2013.01); *B65G 17/345* (2013.01)

(58) Field of Classification Search
CPC ....... B65G 17/12; B65G 17/123; B65G 17/16; B65G 17/08
USPC .......................... 198/796, 799, 800, 813, 795
See application file for complete search history.

(56) References Cited

U.S. PATENT DOCUMENTS

| | | | | |
|---|---|---|---|---|
| 2,339,494 A | * | 1/1944 | Lubahn | .................... A21B 1/46 |
| | | | | 198/798 |
| 3,062,358 A | * | 11/1962 | Woodward | ................ E04H 6/14 |
| | | | | 198/792 |
| 3,662,874 A | | 5/1972 | Muller | |
| 4,139,092 A | * | 2/1979 | Yamano | .................. B65G 17/18 |
| | | | | 198/800 |
| 4,481,860 A | * | 11/1984 | Schiele | ..................... F41A 9/04 |
| | | | | 198/800 |

(Continued)

FOREIGN PATENT DOCUMENTS

EP            0683118 A1    11/1995

*Primary Examiner* — James R Bidwell
(74) *Attorney, Agent, or Firm* — Robert E. Alderson, Jr.

(57) ABSTRACT

Machines for sorting objects having a series of carriages fixed at a given interval (P) to two drive belts configured to move along closed-loop paths in two parallel vertical planes are provided. Each path may include a top horizontal section and a bottom horizontal section joined together by two curved connecting end sections. Two end assemblies may be arranged at the curved end sections of the path. Each assembly may include crown gears which are configured to engage with the belts and a series of sliders which are configured to retain the carriages along a semicircular section close to the crown gears. The carriages are thus able to perform a rotary/translational movement along the end connecting sections and keep their support surface horizontally oriented.

14 Claims, 8 Drawing Sheets

(56) References Cited

U.S. PATENT DOCUMENTS 6,336,549 B1  1/2002  Jen
9,028,613 B2 *  5/2015  Kim .................. C23C 16/45551
                                                    118/715

* cited by examiner

MACHINES FOR SORTING OBJECTS

CROSS-REFERENCE TO RELATED APPLICATION

This application is a National Phase Application of PCT International Application No. PCT/IB2013/059005, International Filing Date, Sep. 30, 2013 which is hereby incorporated by reference in its entirety.

FIELD OF THE INVENTION

The present invention pertains, generally, to the field of continuous-cycle automatic handling of objects; in particular, the invention relates to a vertical sorting machine with carriages for packages, flyers and similar objects.

BACKGROUND OF THE INVENTION

The sector for the automatic sorting of objects such as luggage, packages, letters, flat items, envelopes, dispatch parcels and containers of a varying nature is conventionally divided into two main types of systems: "letter-type" systems, where unloading of the object is performed in a direction coinciding with the direction of advancement of the conveyor, and "cross-belt" systems, where unloading is performed transversely with respect to the direction of advancement.

The latter systems are arranged mainly in a horizontal plane, the advantage of having a flexible sorting apparatus being offset by the problems associated with the large dimensions of the system.

In order to overcome the aforementioned problems, sorting machines of the so-called "cross-belt" type provided with carriages which are self-propelled along a vertical closed-loop path have been developed. In this case also, the system suffers from a drawback associated with overturning of the carriages along the bottom section of the path, which substantially reduces the loading capacity of the system.

In fact, along the semi-circular sections which join together the straight sections of the path, the conveying units undergo a rotation, through 180°, of the surface on which the transported objects are loaded (FIG. 2 of patent publication U.S. Pat. No. 3,662,874 illustrates schematically the overturning movement). This drawback, as can be understood, has a significant adverse effect on the loading capacity of the sorting machine since only half of the overall travel of the conveying units is exploited from an operational point of view.

SUMMARY OF THE INVENTION

One object of the present invention is to increase the loading capacity of a sorting machine of the vertical closed-loop "cross-belt" type, without having to increase the dimensions of the apparatus.

Figure 1:
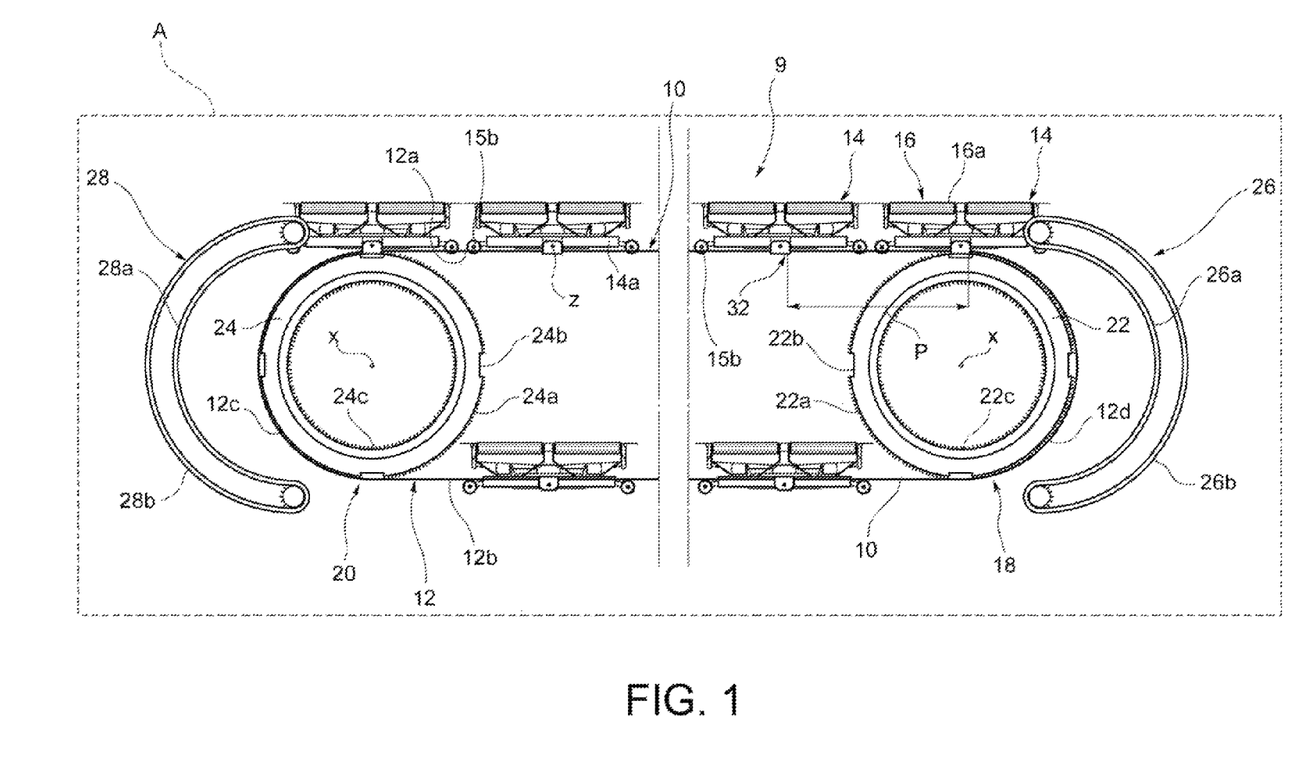
FIG. 1 is a schematic side view of a sorting machine according to an embodiment of the invention.

In order to achieve this result, the conveying units (in the present invention these are comprised, mainly but not exclusively, of carriages which have load support surfaces displaceable transversely with respect to the direction of advancement) must maintain an identical orientation of the load support surfaces along the top and bottom travelways of the closed-loop path (as shown for example in FIG. 1).

In fact, by keeping the horizontal load support surface directed upwards also during the return movement, it is possible to make use of both the straight sections of the closed-loop path, thus doubling the operational capacity of the sorting machine according to the invention, at equal size as compared to a conventional machine.

According to one aspect of the present invention, two end assemblies are arranged at the ends of the straight sections of the carriage path; each end assembly comprises a crown gear which exerts a driving force on a flexible driving element to which the carriages are connected. An element for securing together the carriages and the flexible driving means ensures, during travel around the semicircular section joining together the straight sections of the path, a support point for the carriage.

In order to maintain the orientation of the loading surfaces along the entire path, the carriages must perform a rotary/translational movement with respect to the axis of rotation of the end assembly (while, in the case of conventional machines, a rotation is performed, with consequent overturning of the carriage). The rotary/translational movement allows the carriage to be kept in the horizontal position when passing along the joining section of the path.

The rotary/translational movement is possible if the carriage rests stably on at least four support points arranged in pairs on two opposite sides of the carriage. On each of these two sides, a first support point is provided by the means for retaining together the carriage and the flexible driving means. A second support point is provided by the engagement between a pin, rigidly connected to the frame of the carriage, and a slider moving along a closed-loop path associated with each crown gear present in the end assemblies.

The aforementioned slider exerts a counter-thrusting force on a wheel of the carriage such as to keep the wheel in contact with a cylindrical track inside the end assembly, so as to ensure the second support point necessary for the rotary/translational movement of the carriage during travel around the joining section of the closed-loop path.

These and other objects and advantages are achieved by systems described and claimed herein.

The functional and structural features of a number of embodiments of sorting machines according to the invention will now be described with reference to the attached drawings.

DETAILED DESCRIPTION

Before a plurality of embodiments of the invention are explained in detail, it is to be understood that the invention is not limited, in its application, to the constructional details and the arrangement of the components set forth in the following description or illustrated in the drawings. The invention is capable of other embodiments and may be implemented or carried out in other ways. It should also be understood that the phraseology and terminology have a descriptive function and should not be regarded as limiting. The use of "include" and "comprise" and variations thereof are to be understood as encompassing all the parts listed below and their equivalents, as well as additional parts and equivalents thereof.

With reference initially to FIG. 1, the number 9 designates overall a machine for sorting objects, designed to move a plurality of carriages 14 along a vertical closed-loop path.

Figure 2:
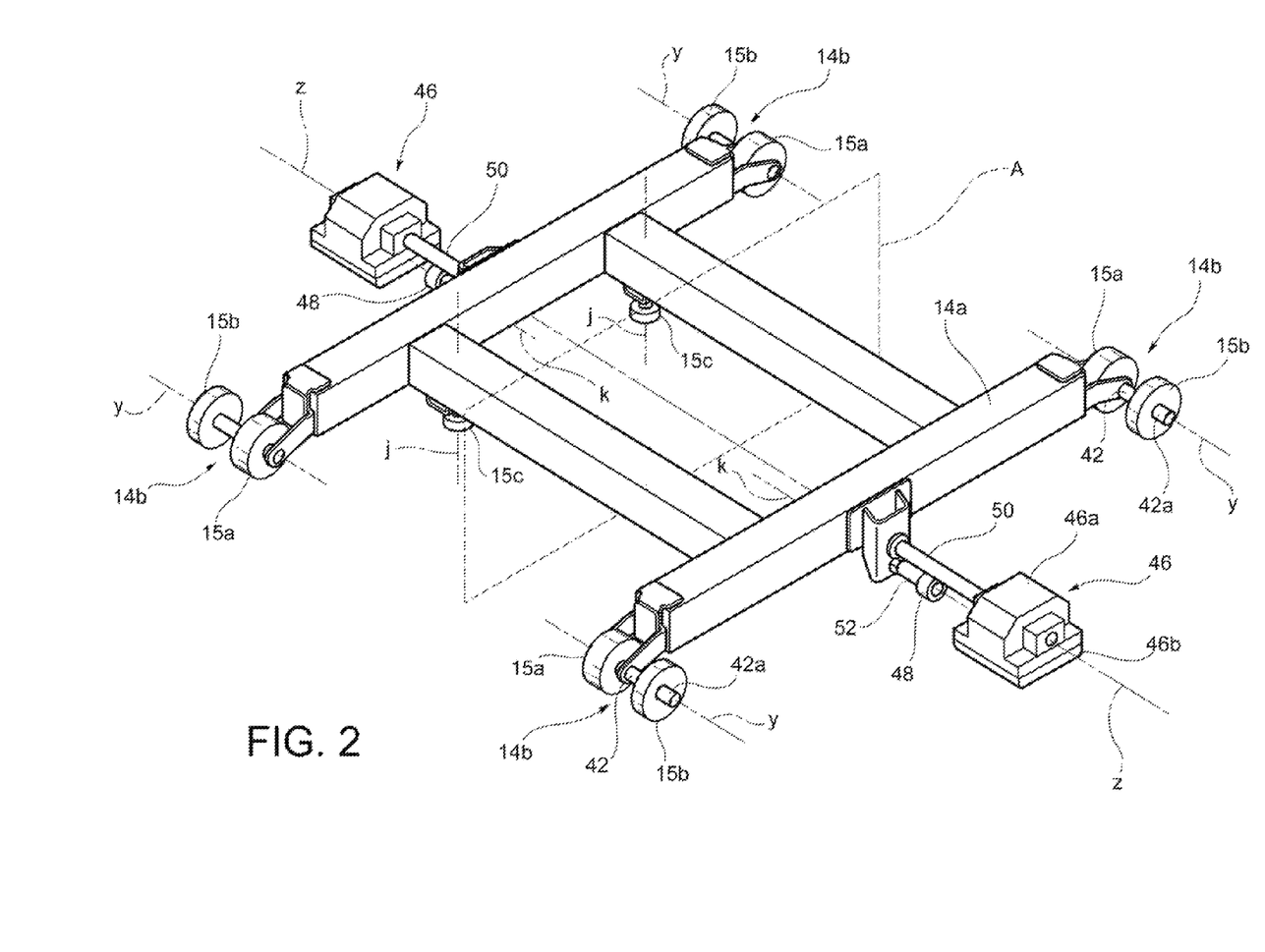
FIG. 2 is a schematic perspective view of a part of a conveying means of the machine according to FIG. 1.

The sorting machine 9 has a symmetrical structure with respect to a vertical plane A passing through the centre of the carriages 14, as can be seen in FIG. 2. The parts of the machine 9, which are visible in FIG. 1, are arranged in a vertical plane which is spaced transversely with respect to the plane A.

With respect to the vertical centre plane A, the sorting machine has a structure which is a mirror image of that shown in the view of FIG. 1. In the following description, reference will be made to only one side of the machine shown in FIG. 1, it being understood that the comments made for one side of the machine are also valid for the opposite side relative to the centre plane A. Throughout the present description and the claims, terms and expressions indicating positions and orientations, such as "longitudinal", "transverse", "vertical" or "horizontal", are to be understood as referring to the vertical centre plane A.

Still with reference to FIG. 1, the carriages 14 moving along a top straight section 12a of the closed-loop path have an object support surface 16 which is directed upwards. It is desirable that the orientation of the support surface 16 should also be maintained along the bottom straight section 12b of the closed-loop path. This object is achieved by means of the end assemblies 18, 20 which allow rotary translation of the carriage 14 from the top straight section to the bottom straight section.

The end assemblies 18, 20 comprise crown gears or gear wheels 22, 24 which, by means of outer peripheral teeth 22a, 24a, engage with and drive a flexible driving means 10, which is suitably configured so as to mesh with the outer teeth 22a, 24a of the crown gears 22, 24.

Figure 3:
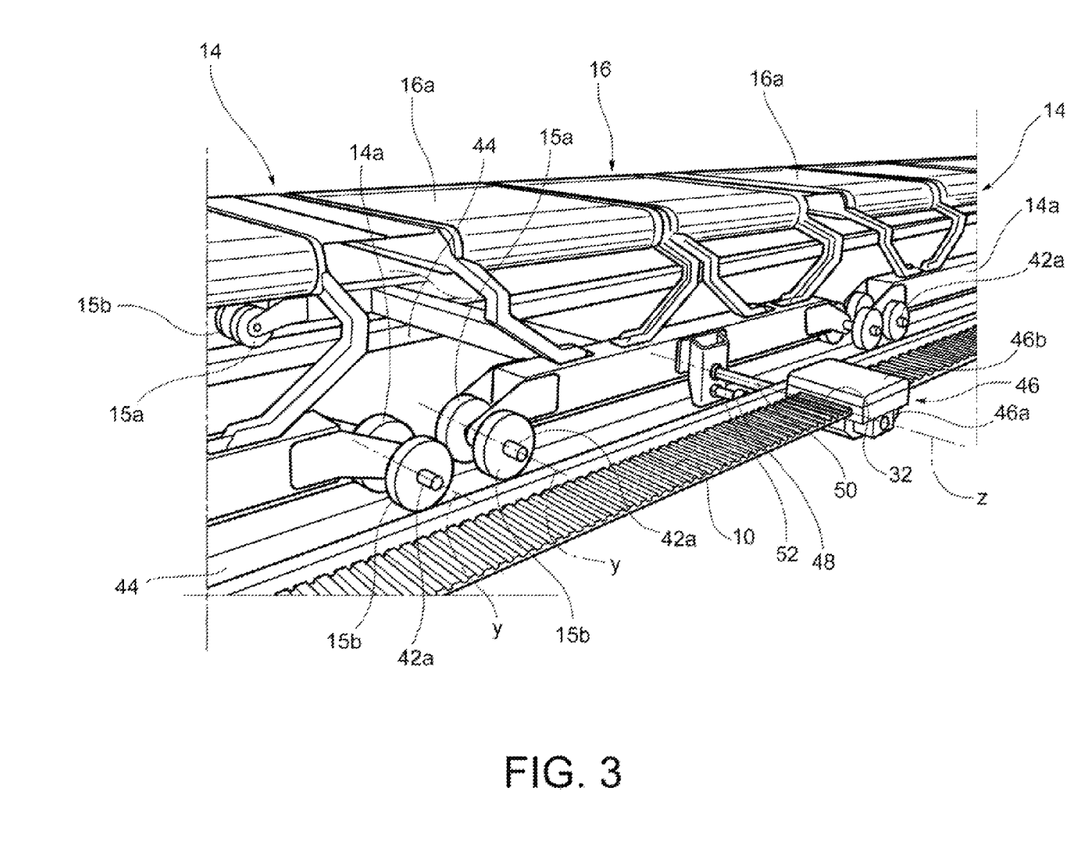
FIG. 3 is a schematic perspective view of a detail of the sorting machine according to FIG. 1.

In a particularly preferred embodiment of the invention, the flexible driving means 10 is a toothed belt, as can be seen in particular in FIG. 3. This solution, although advantageous, is not to be regarded as limiting since it is possible to envisage the use of different flexible driving means, for example chains or the like.

The carriages 14 are driven by the toothed belts 10, provided on both sides of the machine, via locking means 46. The locking means are fixed to the toothed belts 10 and rigidly connected to a frame 14a of the carriage 14 by means of pins 50 which are conveniently aligned along transverse axis of symmetry z of the carriage 14.

The carriages 14 which circulate along the closed-loop path are spaced from each other by an interval P corresponding to the interaxial distance between the locking means 46 of two successive carriages. Advantageously, the interval P between all the carriages is constant.

The crown gears 22, 24, which are visible in FIG. 1 and form part of the end assemblies 18, 20, are rotatable about axes x which are horizontal and transverse with respect to the plane A. The crown gears 22, 24 may provide, on the outer peripheral teeth 22a, 24a, a plurality of peripheral seats or recesses 22b, 24b which are circumferentially spaced and designed to receive and retain the locking means 46 when passing along the end connecting sections 12c, 12d which join together the ends of horizontal straight sections 12a, 12b.

In this example, the gear wheels 22, 24 also have inner toothed profiles 22c, 24c which are designed to mesh with motor-driven transmission members, for example a drive shaft 70 operated by an external motor (not shown).

In a preferred embodiment of the invention, the two crown gears 22 of the first end assembly 18 have a driving function, whereas the two crown gears 24 of the second end assembly 20 are rotationally driven about the axis x by the driving force exerted by the toothed belt 10.

Moreover, a plurality of mobile retaining units 30 moving around inside vertical closed-loop paths 26, 28 are associated with each gear wheel. Each path 26, 28 has a semicircular section 26a, 28a which, conveniently, is longitudinally displaced, with respect to the curved joining sections 12c, 12d, by a length equal to the distance between the pin 50 of the locking means 46 and a pin 42. Pin 42 is visible in FIG. 2 and is rigidly connected to a corner 14b of the carriage frame 14a.

The plurality of mobile retaining units 30 moves along an operational section of the vertical closed-loop path 26, 28, corresponding to the semicircular section 26a, 28a, and along a return section 26b which, in the present embodiment, assumes a semicircular profile. The form of the return branch 26b is not to be regarded as binding.

FIG. 2 schematically illustrates the structure of a carriage 14 shown without the horizontal support surface 16. Four primary support wheels 15a, which are rotatable about a transverse axis y via a pin 42 rigidly connected to the frame 14a, are arranged at the four corners 14b of the frame 14a. Secondary wheels 15b, which are advantageously located on the pin 42 so as to leave a projecting end 42a free, are rotatably mounted on the said pin. A pair of idle wheels 48, which are rotatable about a horizontal axis k parallel to or coinciding with the pivoting axis z of the locking means 46, are mounted on pins 52 rigidly connected to the longitudinal side members of the frame 14a.

Finally, opposing roller wheels 15c may be rotatably mounted on each carriage about a vertical axis j and act transversely on rails 44, shown in FIG. 3, in order to oppose any imbalances, with respect to the longitudinal direction of the carriage, induced by the forces acting on the carriage itself.

FIG. 3 schematically shows a plurality of carriages 14 which are moved by means of the connection with the toothed belt at fixing points 32. From the drawing it can been seen how the primary support wheels 15a rest on the central rails 44, while the secondary wheels 15b, since they are spaced from the former in the transverse direction along the pin 42, do not make contact with the rail 44 and therefore are suspended.

The driving force needed to move the carriage is transmitted from the toothed belt to the frame 14a via the locking means 46 and the pin 50. In one embodiment, the locking means 46 comprises two parts 46a, 46b by means of which the locking means 46 engages simultaneously with the toothed belt 10 and the pin 50, forming with the latter a connection which allows pivoting of the locking means 46 about the pivoting axis z.

In a similar manner to the secondary wheels 15b, the idle roller 48 is suspended, in the arrangement shown in FIG. 3 which relates to the passage of the carriages along the top, horizontal, straight section 12a and bottom, horizontal, straight section 12b.

In one embodiment, the horizontal support surface 16 is configured so as to allow unloading of the objects in a transverse direction with respect to the direction of advancement of the carriages. This arrangement is to be regarded as preferable, but not limiting. Unloading of the objects may be performed by means of one or more motor-driven rollers 16a which have their top surfaces coplanar with the support surface 16.

Figure 4:
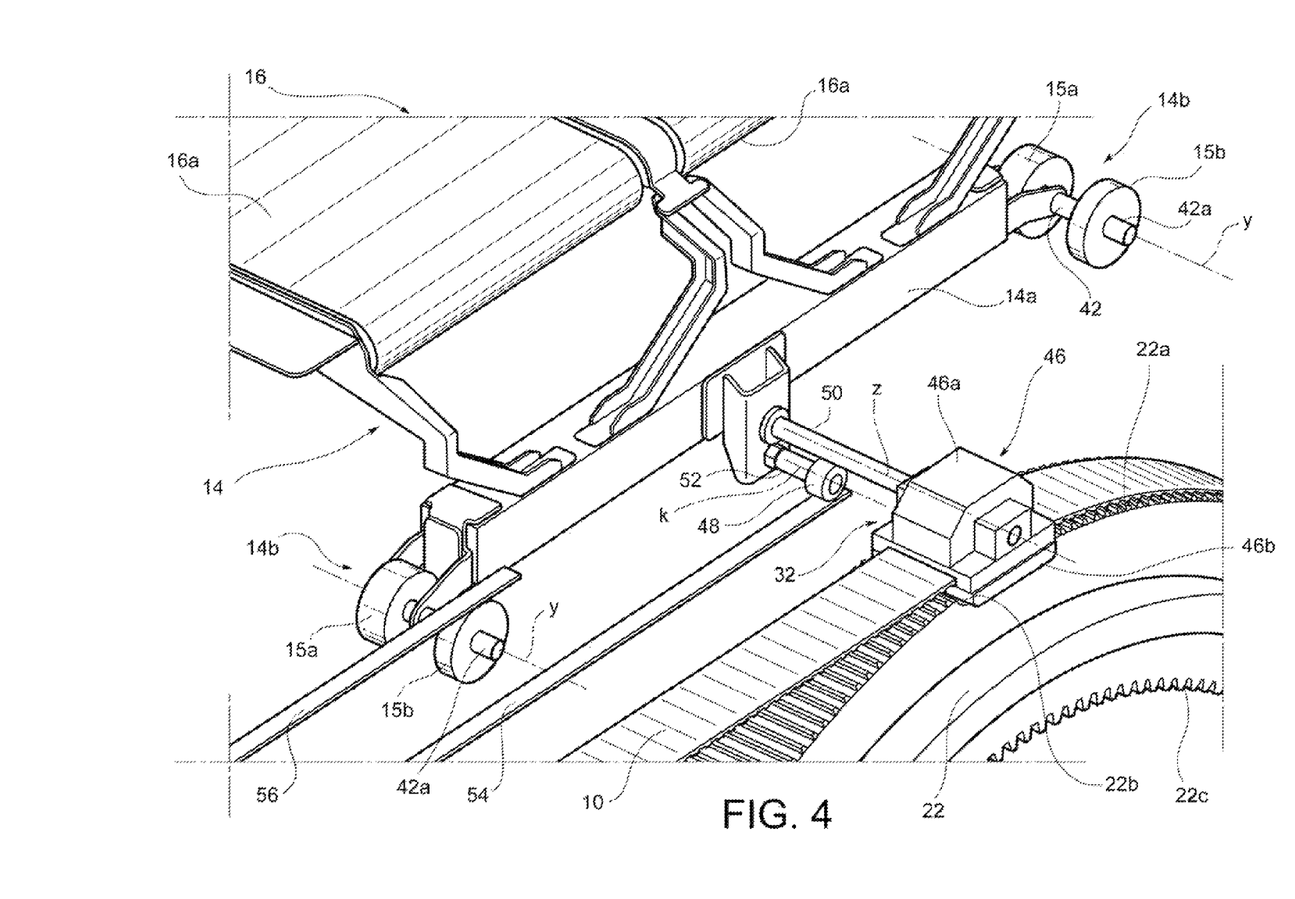
FIG. 4 is a schematic perspective view of a further detail of the sorting machine.

FIG. 4 shows the arrangement at the start of the rotary/translational movement of the carriage 14 along the curved end section 12c, 12d of the two end assemblies. In order to allow the aforementioned rotary/translational movement, it is necessary to ensure that the carriage is supported at at least two points.

In the vicinity of the points where the curved end sections 12c, 12d are joined to the linear, horizontal, straight sections 12a, 12b, the rails 44 which support the carriages by means of contact with the primary wheels 15a are interrupted. Therefore, the primary wheels 15a situated at the front (with respect to the direction of movement of carriages) are not supported.

During an initial phase the locking means 46 do not rest inside a peripheral seat 22b, 24b and, consequently, they cannot yet provide a suitable support point for the carriage. During the phase which immediately precedes the rotary/translational movement of the carriages, the two support points are ensured, respectively, by the contact between the idle rollers 48 and respective bottom additional guides 54 as well as by the contact between the rear secondary wheels 15b and the respective top secondary guides 56. Preferably, during the aforementioned initial phase, the rear primary wheels 15a continue to rest on the rails 44 until the phase described in the following paragraph occurs.

When the locking means 46 is seated inside the peripheral seat 22b, the rollers 48 and the rear secondary wheels 15b pass beyond the ends of the bottom and top secondary guides 54, 56, thus no longer having support points. Similarly, the rear primary wheels 15a also are no longer supported by the rails 44.

Figure 5:
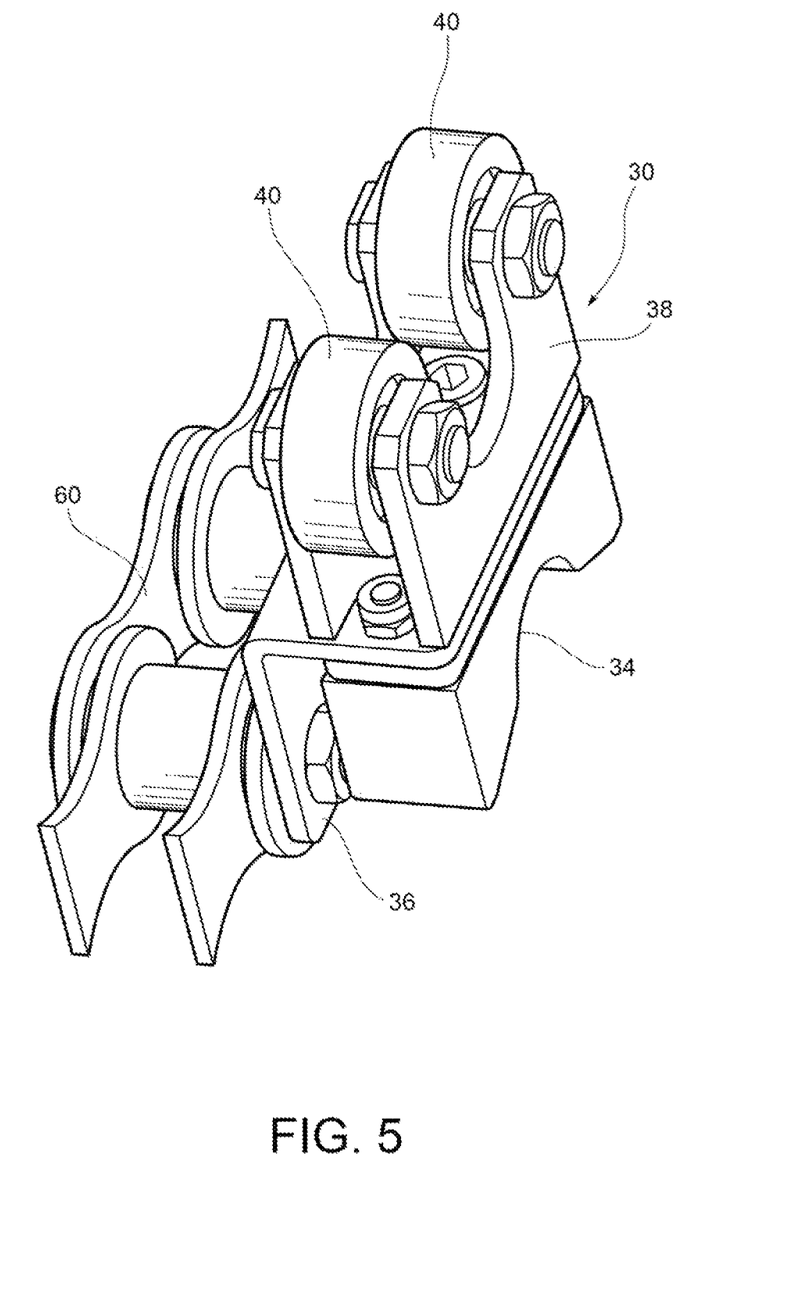
FIG. 5 is a schematic axonometric view of a component of the sorting machine according to an embodiment of the invention.

At the same time, in order to ensure the necessary dual support point for the carriage, the projecting ends 42a of the pins 42 of the front primary and secondary wheels are engaged by two mobile retaining units 30, shown in FIG. 5. These mobile retaining units 30, or sliders, move along the vertical closed-loop paths 26, 28 and are fixed to flexible transmission means 60.

These flexible transmission means 60 are, in the embodiment shown in FIG. 5, roller chains, although flexible means with a different structure and made of different material (for example belts) may also be used.

The roller chains 60 move along the vertical closed-loop paths 26, 28, following the profiles of the semicircular branch 26a and the return branch 26b. According to an embodiment of the invention, the recirculating movement of the roller chains 60 along the vertical closed-loop path 26, 28 can be achieved by means of meshing with pinions 26c which may be idle or motor-driven.

A plurality of sliders 30 are fixed to the chain and driven along the vertical closed-loop path 26, 28.

In the embodiment shown, the sliders 30 comprise a shaped plate 36 for fixing to the roller chain 60, a frame 38 which supports rolling or rotatable roller means 40, and an engaging seat 34, preferably having a semi-cylindrical shape formed on one side of the slider opposite to the side where the rotatable rollers 40 are mounted.

The sliders 30 are spaced, along the chain 60, by a length such that, when the carriages arrive in position, there is always one slider available for each carriage.

According to one embodiment, the sliders 30 may be spaced, along the chain 60, by a length corresponding to the interval P between the carriages or a submultiple of the interval P.

Figure 6:
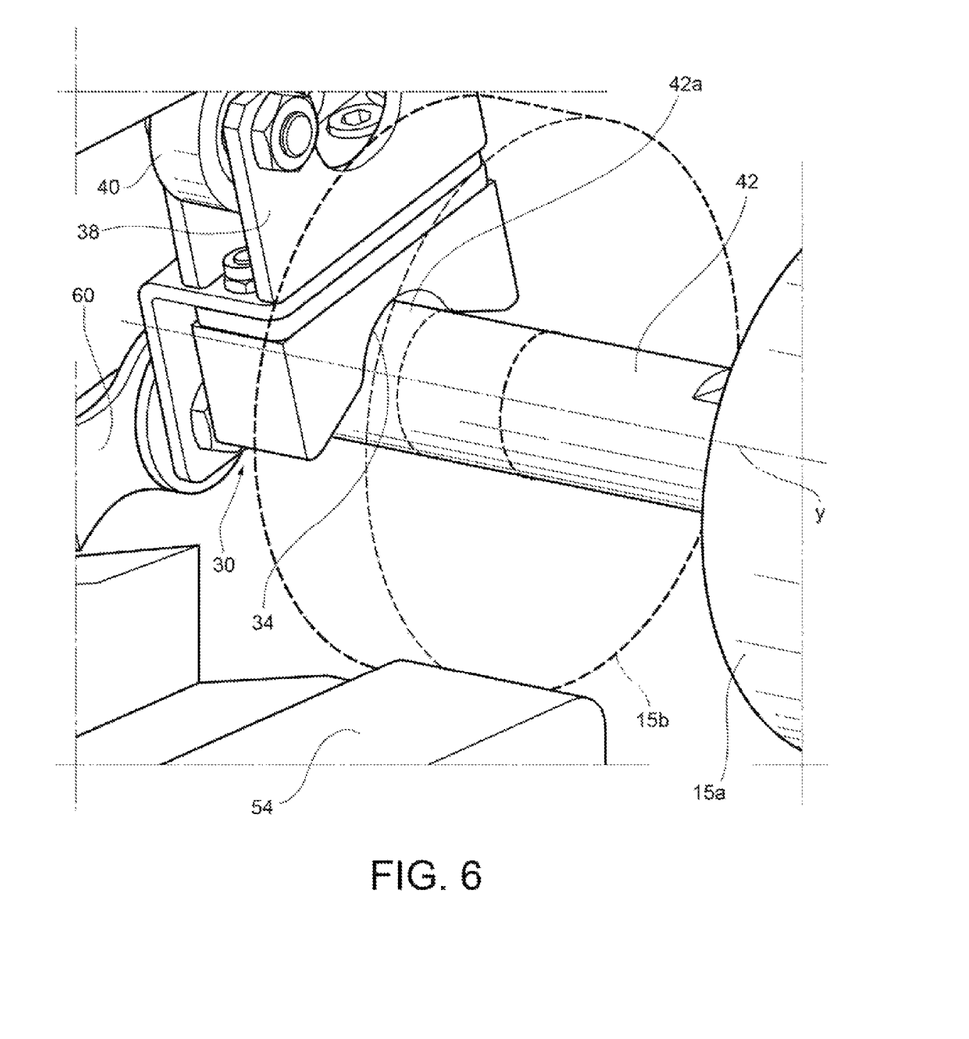
FIG. 6 is a schematic perspective view of a detail of the sorting machine according to the invention, provided with the component of FIG. 5.

In particular, when the carriage rests exclusively on the locking means 46 seated inside the recesses 22b, a pair of sliders 30 engage with the projecting ends 42a of the pins 42 of the pair of front wheels of the carriage. FIG. 6 shows the connection between the semi-cylindrical seat 34 of the slider 30 and the free end 42a of the pin 42.

The function of the slider 30, which may be formed differently from that shown in FIG. 5, for example without rollers 40, but only with the fixing plate 36 and the semi-cylindrical engaging seat 34, is that of exerting a force which constrains the secondary wheel 15b to remain in contact with a radially inner cylindrical raceway 68. Raceway 68 is concentric with respect to the semicircular section 26a, 28a of the vertical closed-loop path 26, 28 inside which the chain 60 is seated.

Figure 7:
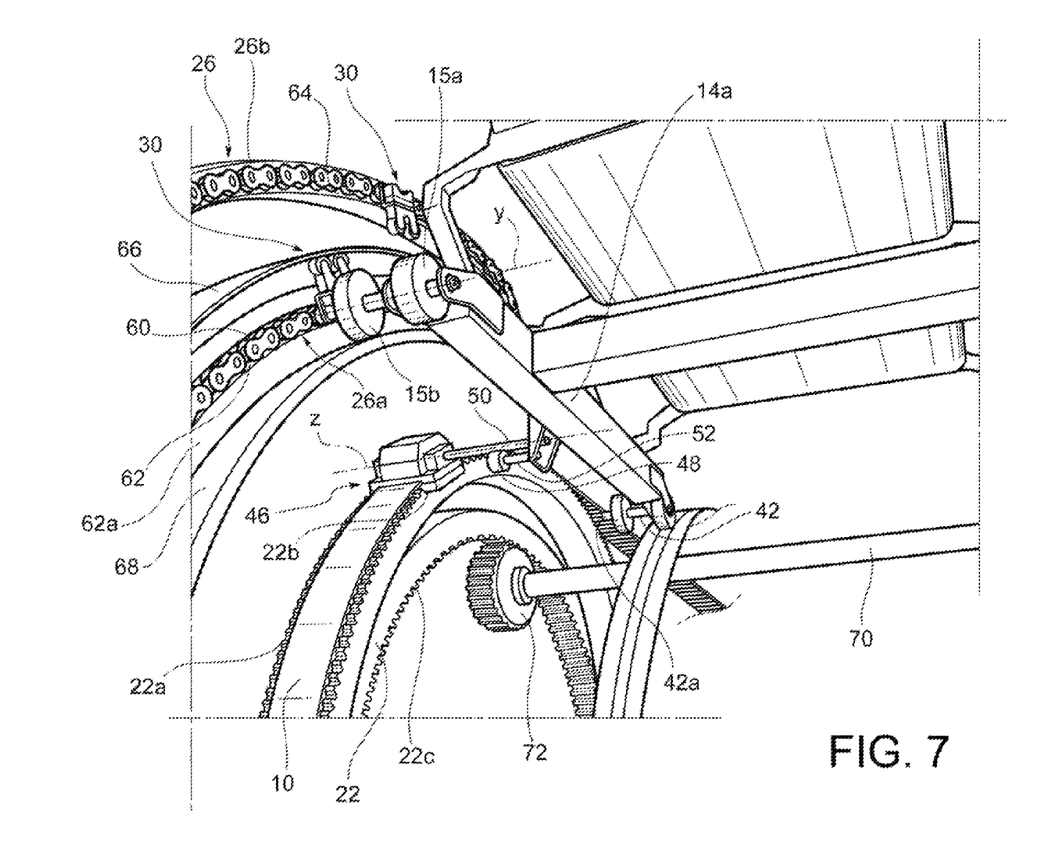
FIG. 7 is a schematic perspective view of a detail of a sorting machine according to an embodiment of the invention.
Figure 8:
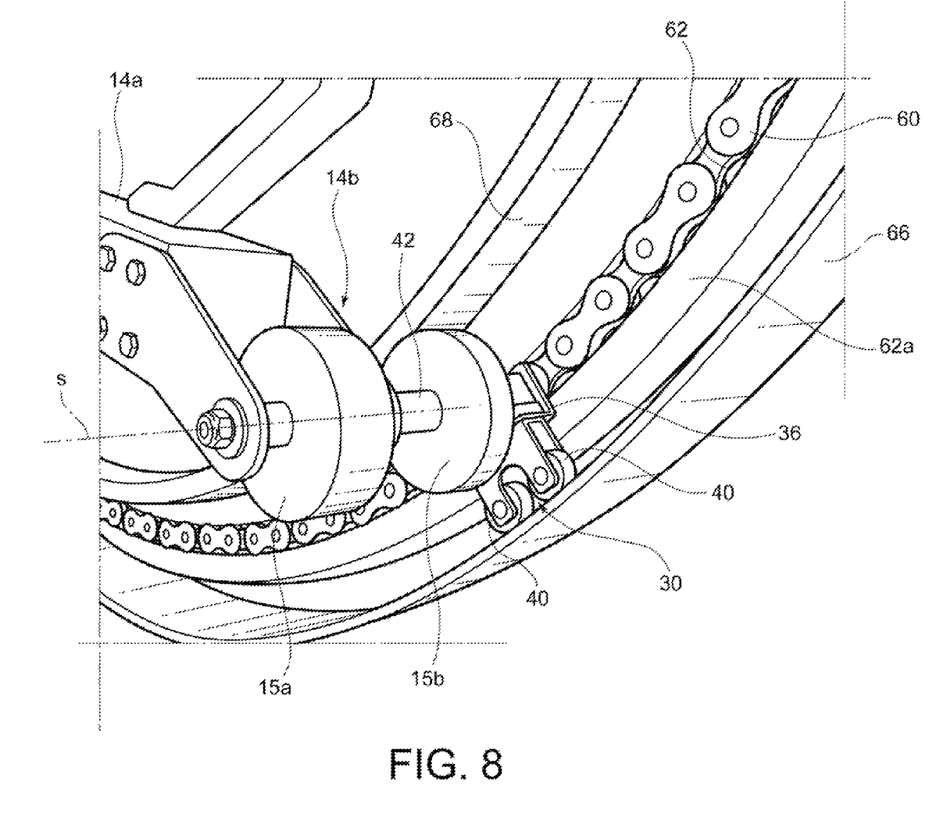
FIG. 8 is a schematic perspective view of a further detail of the sorting machine according to the invention.

In the embodiment shown in FIGS. 7 and 8 the constraining action of the slider with respect to the secondary wheel 15b is exerted by means of the opposing force generated by the radial contact between the rollers 40 of the slider 30 and a radially outer, cylindrical raceway 66 situated opposite the radially, inner raceway 68 on which the secondary wheel 15b rests.

According to an alternative embodiment (not shown), instead of the rollers 40 the slider 30 may have a runner or other low-friction sliding means able to slide along the radially outer cylindrical raceway 66.

The chain 60 may be partially seated inside guide channels 62, 64 arranged respectively along the semicircular operative section 26a and return section 26b of the vertical closed-loop path 26, 28.

FIG. 7 shows a drive shaft 70 which is oriented parallel to the axis of rotation x of the crown gears 22, 24 and which simultaneously meshes with the radially inner crown gears 22c of a same end assembly 18 via pinions 72. In this way, the drive shaft 70 imparts a driving torque to both the crown gears 22 present on the two sides of one end of the sorting machine 9.

FIG. 8 illustrates in greater detail that which has been described in the above paragraphs. In particular, it should be noted that in the embodiment shown in FIG. 8, the channel 62 inside which the chain 60 is housed has a cross section which is laterally open towards the vertical centre plane A. The channel 62 is, in one embodiment of the invention, formed in a cylindrical guide 62a.

Since the engagement between the slider and the pin 42, on one side, and between the locking means 46 and the crown gear, on the other side, ensures that the carriage has two support points along the whole semicircular joining section 12c, 12d, it is possible to keep the carriage 14 in the horizontal position during the rotary/translational movement. Thereby it is ensured that the support surface 16 remains always horizontal and directed upwards when passing between the top straight section 12a and the bottom straight section 12b.

The advantage achieved is that of making use of both the top travel and bottom travel of the carriages along the entire vertical closed-loop path, ensuring at the same time more compact dimensions of the sorting machine at equal number of objects which can be sorted by the system.

Different aspects and embodiments of sorting machines according to the invention have been described. It is understood that each embodiment may be combined with any other embodiment. The invention, moreover, is not limited to the embodiments described, but may have certain variations and still fall within the scope of protection claimed herein.

The invention claimed is:

1. A machine for sorting objects, comprising:
   two flexible driving elements configured to move along two closed-loop paths in two parallel vertical planes, where each path comprises a top horizontal straight section, a bottom horizontal straight section and two curved connecting end sections which join together opposite ends of the straight sections;
   a plurality of carriages each having at least one horizontal support surface directed upwards, the carriages being fixed at a given interval (P) to both the flexible driving elements;
   two end assemblies arranged at the end sections of the paths, wherein each end assembly comprises two crown gears mounted rotatably in two parallel vertical planes, about a horizontal axis of rotation (x), and wherein each crown gear engages with one of the two flexible driving elements so as to drive it around said path;
   a plurality of mobile retaining units associated with each crown gear wherein:
   each plurality of retaining units being configured to circulate along a vertical closed-loop path which comprises a semicircular section, the retaining units of each plurality being spaced from each other by a given interval;
   each semicircular section of the closed-loop paths is displaced longitudinally with respect to a corresponding semicircular section of an outer periphery of the associated crown gear; and
   the mobile retaining units each have an engaging element for retaining a rigid element rigidly connected to the carriage along said semicircular section so that, along each of the end connecting sections, each carriage performs a rotary/translational movement with respect to the axis of rotation (x) of the pair of gear wheels of the associated end assembly, thus keeping the support surface horizontally oriented.

2. The sorting machine of claim 1, wherein each carriage comprises:
   a frame with four corners;
   configured for primary wheels, each arranged in the vicinity of one of the corners and configured for rolling along pairs of rails which extend along the straight sections of the path; and
   four secondary wheels arranged at the four corners of the carriage and rotatable idly about two horizontal axes (y) oriented transversely with respect to the direction of advancement of the carriages.

3. The sorting machine of claim 1, wherein each carriage provides, on two opposite sides, a respective locking element which is fixed to a respective flexible driving element, where both the locking elements of a same carriage pivot about a same horizontal and transverse pivoting axis (z) of the carriage.

4. The sorting machine of claim 3, wherein the pivoting axis (z) is equally spaced between the two horizontal axes (y) about which the secondary wheels of the carriage are mounted.

5. The sorting machine of claim 3, wherein the carriage comprises, on two opposite sides, a further respective idle roller mounted about a respective horizontal axis (k) parallel to or coinciding with the pivoting axis (z).

6. The sorting machine of claim 1, wherein each of the two pluralities of mobile retaining units, at each end assembly, is fixed to a flexible transmission element circulating around the vertical closed-loop path which comprises said semicircular trajectory section.

7. The sorting machine of claim 1, wherein the semicircular section of the closed-loop paths is displaced longitudinally, with respect to the corresponding semicircular section of the outer periphery of the associated gear wheel, by a length corresponding to a distance between the retaining unit and a point at which the carriage is fixed to the flexible driving elements.

8. The sorting machine of claim 6, wherein each flexible transmission element is partially accommodated within respective guide channels having a cross section open on a side directed towards a vertical center plane of the sorting machine.

9. The sorting machine of claim 1, wherein each end assembly comprises a respective pair of concentric, cylindrical raceways associated with each of the two gear wheels.

10. The sorting machine of claim 1, wherein each mobile retaining unit comprises at least one rolling element or a low-friction sliding element arranged on a first side of the unit and said engaging element or seat arranged on a second side opposite to the first side.

11. The sorting machine of claim 2, wherein the secondary rollers are configured to roll along one of the two cylindrical raceways, while the rolling elements of the mobile retaining units engage in rolling fashion with the other one of the two raceways.

12. The sorting machine of claim 1, wherein each gear wheel comprises outer peripheral teeth and a plurality of radially outer peripheral seats which are spaced circumferentially from each other at the same interval as the interval (P) of the carriages; each seat being configured to receive at least partially and retain one of a plurality of blocks which fix the carriages to the flexible driving elements.

13. The sorting machine of claim 1, wherein each crown gear comprises a radially inner crown gear configured to receive a driving torque from a drive shaft which is oriented parallel to the axis of rotation (x), which drive shaft is configured to mesh with and simultaneously causes the rotation of both the crown gears of a same end assembly about the respective axis of rotation (x) of the end assembly.

14. The sorting machine of claim 1, wherein the retaining units of each plurality are spaced from each other at an interval corresponding to the interval (P) of the carriages or a submultiple thereof.

* * * * *